2,753,276

PROCESS OF COATING A SURFACE WITH A FOAMED POLYURETHANE COMPOSITION

Franzkarl Brochhagen, Odenthal, Bezirk Koln, Peter Hoppe, Troisdorf, and Hans-Willi Paffrath, Koln-Deutz, Germany, assignors to Farbenfabriken Bayer Aktiengesellschaft, Leverkusen, Germany, a corporation of Germany No Drawing. Application August 10, 1954,
Serial No. 449,011

Claims priority, application Germany August 19, 1953

6 Claims. (Cl. 117—72)

The present invention relates to an improved process of bonding and more particularly to a process of bonding a hard foamed polyurethane composition to the surface of a covering layer.

In sandwich constructions in which a light foamed polyurethane composition is bonded to high strength covering layers of metal, plastic or plywood, it is necessary that there be adequate adhesion of the foamed composition to the covering layers in order to obtain the required supporting effect. Thus, when this method of construction is employed, it is essential that the adhesion of the foamed product to the covering layer be greater than the tensile strength of the foamed product as it is most important to avoid separation of the covering layer which will occur if the whole structure becomes bulged or buckled.

It is known in the art that, when hollow bodies made of metal, plastic or wood are filled with a foamed polyurethane composition, it is generally necessary to select a foam-forming composition which develops a relatively high internal pressure during the foaming process in order to improve the adhesive power of the expansible and reactive starting mixture.

It is also known that the adhesion between a foamed polyurethane and a covering layer can be improved by priming if the latter is a metal plate or plywood or by roughening the covering layer by rubbing with emery or by sandblasting.

These methods of bonding foamed polyurethane compositions to covering layers being subject to the above limitations are commercially unattractive.

Therefore, a primary object of the present invention is to provide a commercially attractive process of bonding hard foamed polyurethane compositions to covering layers of all kinds, which is not subject to the limitations mentioned earlier herein.

Another object of the invention is to provide a process of bonding hard foamed polyurethane compositions to covering layers in sandwich constructions, in which the tensile strengths of the bonds are greater than those of the foamed compositions.

An additional object of the invention is to provide a process of bonding hard foamed polyurethane compositions to hollow bodies made of metal, plastic or wood, which does not require the selection of foam-forming compositions that develop a relatively high internal pressure during foaming in order to obtain satisfactory bonding between the foamed products and the hollow bodies.

A further object of the invention is to provide a process of bonding hard foamed polyurethane compositions to covering layers, which is eminently suitable for use in bonding such compositions to very thin layers of light metal or steel.

A still further object of the invention is to provide novel bonded structures comprising a hard foamed polyurethane composition bonded to the surface of a covering layer.

Other objects and advantages of the present invention will be obvious to those skilled in the art as the description unfolds.

In accordance with the instant invention, it has been found that the adhesion of a hard, foamed polyurethane composition to covering layers of all kinds may be improved by pretreating the covering layers with a coating of a reaction accelerator for the foaming process. Illustrative examples of suitable reaction accelerators are tertiary organic amines, such as hexahydro-dimethylaniline, ester amines, such as esters of N-diethyl ethanol amines with organic dicarboxylic acids, and complex organic salts of metals of the eighth group of the periodic system, such as ferric acetyl acetonate. Thus, it is possible by the method of the instant invention to intimately anchor the foamed product produced during the foaming process to the initial accelerator coating which in turn adheres satisfactorily to the covering layer.

Broadly stated, the present invention is directed to a novel process, which comprises applying a reactive hardenable, foam-forming polyurethane composition to the surface of the covering layer that has been pretreated with a reaction accelerator for the foaming process, and carrying out the foaming process.

More specifically, the present invention is directed to a method which comprises applying a reactive hardenable, foam-forming polyurethane composition to the surface of the covering layer that has been pretreated with a reaction accelerator for the foaming process, which reaction accelerator is selected from the group consisting of tertiary organic amines, ester amines and complex organic salts of metals of the eighth group of the periodic system, and carrying out the foaming process.

Stated in a somewhat different manner, the invention is directed to a method which comprises pretreating a surface of a covering layer with a reaction accelerator for a reactive, hardenable foam-forming polyurethane composition, applying said composition to said pretreated surface and carrying out the foaming process.

Reactive, hardenable foaming-forming polyurethane compositions are mixtures of organic polyisocyanates, water and a polymer having a purality of hydroxy- and/or carboxylic acid groups. Especially suitable polymers of this kind are the polyesters. In this connection see "Modern Plastics" 24, pages 149 seq. (1947).

The present invention is illustrated by the following examples without being restricted thereto.

Example 1

A thin layer of hexahydro-dimethylaniline is sprayed on the inside of a covering layer which is to be bonded to a hard, foamed polyurethane composition. A reactive, hardenable, foam-forming polyurethane composition is applied to the sprayed surface and then the foaming process is carried out. The resulting adhesion between the covering layer and the foamed product is highly satisfactory.

Example 2

The inside surface of a hollow structure which is to be bonded to a hard, foamed polyurethane composition is pretreated by spraying a thin layer of ferric acetyl acetonate onto this surface. To the pretreated surface, a reactive, hardenable foam-forming composition is applied and then the foaming process is carried out. The resulting adhesion between the hollow structure and the foamed product is greater than the tensile strength of the latter.

The process of the present invention is particularly suitable for bonding a hard foamed polyurethane composition to the surface of very thin covering layers such as layers of light metal or steel having a thickness of 0.1 to 0.4 mm. since subjecting such thin layers to sandblasting or to an abrasive process causes serious deformation thereof. In applying this process to metals, it is essential to degrease the metal covering layers prior to the pretreatment operation.

What we claim is:

1. An improved process for bonding a hard foamed polyurethane composition to the surface of a covering layer, which comprises applying a reactive hardenable, foam-forming polyurethane composition to a surface of the covering layer which has been pretreated with a reaction accelerator for the foaming process, and carrying out the foaming process.

2. An improved process for bonding a hard foamed polyurethane composition to the surface of a covering layer, which comprises pretreating said surface with an accelerator for a reactive hardenable foam-forming polyurethane composition, applying said composition to said pretreated surface and carrying out the foaming process.

3. A process as defined in claim 2, wherein the reaction accelerator is selected from the group consisting of tertiary organic amines, ester amines, and complex organic salts of metals of the eighth group of the periodic system.

4. A process as defined in claim 3, wherein hexahydrodimethylaniline is the tertiary organic amine employed.

5. A process as defined in claim 3, wherein ferric acetyl acetonate is the complex organic salt employed.

6. A bonded structure comprising a hard foamed polyurethane composition bonded to the surface of a covering layer by the proces defined in claim 1.

References Cited in the file of this patent

UNITED STATES PATENTS

| | | |
|---|---|---|
| 2,639,252 | Simon | May 19, 1953 |
| 2,650,212 | Windemuth | Aug. 25, 1953 |
| 2,657,151 | Gensel | Oct. 27, 1953 |
| 2,690,987 | Jeffries | Oct. 5, 1954 |

OTHER REFERENCES

Bjorksten: "Modern Plastics," April 1954, pages 143, 144, 146, 228 and 229. (Copy in Division 67.)